United States Patent
Ziauddin et al.

(10) Patent No.: US 8,054,882 B2
(45) Date of Patent: Nov. 8, 2011

(54) METHOD AND SYSTEM FOR PROVIDING BI-DIRECTIONALLY PREDICTED VIDEO CODING

(75) Inventors: Syed Muhammad Ziauddin, Islamabad (PK); Imran-ul Haq, Islamabad (PK); Muhammad Zafar Javed Shahid, Islamabad (PK)

(73) Assignee: Streaming Networks (Pvt.) Ltd., Santa Clara, CA (US)

( * ) Notice: Subject to any disclaimer, the term of this patent is extended or adjusted under 35 U.S.C. 154(b) by 1555 days.

(21) Appl. No.: 11/129,618

(22) Filed: May 13, 2005

(65) Prior Publication Data

US 2006/0256866 A1    Nov. 16, 2006

(51) Int. Cl.
*H04N 7/12*         (2006.01)
(52) U.S. Cl. ......... 375/240.15; 375/240.12; 375/240.13; 375/240.14; 375/240.16
(58) Field of Classification Search . 375/240.12–240.16
See application file for complete search history.

(56) References Cited

U.S. PATENT DOCUMENTS 5,608,458 A * 3/1997 Chen et al. ............... 375/240.14
7,194,035 B2 * 3/2007 Dumitras et al. ........ 375/240.26

* cited by examiner

*Primary Examiner* — Jay Au Patel
*Assistant Examiner* — Geepy Pe
(74) *Attorney, Agent, or Firm* — Firasat Ali, Creso Legal

(57) ABSTRACT

A segment of a B picture is encoded using motion estimation based prediction according to a determination as to whether motion vectors corresponding to a number of already constructed reference pictures of the B picture are acceptable for use in a direct prediction mode without further refinement or whether refined motion vectors are needed. In response to a determination that refined motion vectors are needed, refined motion vectors are computed through a motion estimation process and are used to encode a temporal direct mode. The coded segment of the B picture does not include refined motion vectors in an encoded bit stream. Decoding the encoded bit stream involves identifying the mode selected for coding the segment of the B picture. Where the temporal direct mode using refined motion vectors was selected for encoding, local motion estimation refinement is used to generate local motion vectors, which are used to reconstruct the segment of the B picture.

15 Claims, 7 Drawing Sheets

METHOD AND SYSTEM FOR PROVIDING BI-DIRECTIONALLY PREDICTED VIDEO CODING

BACKGROUND

1. Field

The present invention relates generally to video processing, and more specifically, to methods and systems for providing bi-directionally predicted video coding.

2. Background

The advent of high-speed, low-cost microprocessors has prompted a rapid growth in the development of devices that enable efficient storage and transmission of digital audio and video data. The huge demand for such devices, along with the desire to improve the quality of stored and/or transmitted audio and video data in systems with limited storage and transmission capacities, has resulted in rapid advancement of video data compression techniques. Furthermore, the typical large size and inherent redundancy of video files have also incentivized the development of such techniques.

Several ISO/ITU standards on video compression exist including, for example, MPEG1, MPEG2, MPEG4, H.263, and H.264. These standards exploit the spatio-temporal correlation in the video data, along with entropy-coding techniques, to achieve high compression ratios. These standards define three basic types of coded images or pictures including Intra predicted (I), Inter predicted (P) and Bi-directionally predicted (B) pictures. As B pictures employ motion-estimation-based prediction from past as well as future reference pictures, the coding efficiency of B pictures is in general superior to that of the other two types of pictures mentioned above.

The existing ISO/ITU video coding standards provide several methods (modes) for encoding bi-directionally predicted B pictures. The basic modes include a forward prediction mode, a backward prediction mode, a bi-directional prediction mode and a direct prediction mode. While the first three modes mentioned above require coding of all the motion vector data of the predicted picture with respect to a reference picture or pictures, the direct prediction mode requires coding of either a very small amount of motion vector data or, in some cases, no motion vector data at all. Several variants of the direct prediction mode appear in different video coding standards. In these various direct prediction modes, the forward and backward motion vectors are derived from the motion vectors that have already been computed between the reference pictures. These various direct prediction modes are thus particularly attractive because their implementation is computationally less involved and they are highly compressible. FIG. 1 illustrates a direct mode of the MPEG4 standard.

The latest video coding standard, the H.264 (ISO/IEC 14496-10), achieves much higher coding efficiency compared to previous standards. This is accomplished mainly due to better exploitation of the spatio-temporal correlation that may exist between picture segments. The main tools introduced in H.264 for this purpose are variable block sizes for motion compensation, multiple reference frames, generalized B images, multiple hypothesis prediction, intra prediction, and two direct modes for bi-directionally predicted images. The importance of direct modes is even higher in H.264 since it allows motion-estimation-based prediction at a much smaller block level. FIG. 2 illustrates a direct mode of the H.264 standard.

The usefulness of conventional direct modes, however, is limited to the case where the motion of picture segments in the bi-directionally predicted B picture is linear and of low intensity. These modes employ scaled motion vectors between reference pictures for predictive coding. Besides, in the conventional direct modes, the reverse motion vectors used for backward prediction are simply the scaled negative values of the forward motion vectors. This is a crude approximation and yields poor predictions that result in lower coding efficiency. The coding efficiency of direct modes is further reduced when motion vectors are not available in the reference picture(s), as in the case of Intra segments in the reference pictures.

Hence, it would be desirable to provide methods and systems that are capable of providing bi-directionally predicted video coding in a more efficient manner.

SUMMARY

The present invention can be used to improve the coding efficiency of the video encoding process for storage and transmission of video data. More specifically, the present invention relates to motion estimation based bi-directional predictive encoding (compressing) and decoding (de-compressing) of video data.

In one aspect, a new method for increasing the coding efficiency of a bi-directionally predicted video picture is disclosed. In one embodiment, a video encoder executing the new method is disclosed. The video encoder uses a motion estimation process to improve the forward and/or backward motion vectors between reference pictures of a bi-directionally predicted B picture for use in predictive coding. The video encoder includes control logic configured to choose between the conventional bi-directionally predicted B modes, and the new temporal direct mode, for encoding each segment of the picture. If the new temporal direct mode is selected to encode a picture segment, the video encoder improves the motion vectors between the reference pictures through motion estimation step(s) and then performs motion estimation based predictive encoding of the picture segment by utilizing the improved forward and/or backward motion vectors. The video encoder sends the residual data along with the mode information in an encoded bit stream.

In another embodiment, the present invention also includes a video decoder that locally generates the same forward and/or backward motion vectors as generated by the video encoder using the same motion estimation process as adopted by the video encoder. For decoding the new temporal direct mode as signaled by the video encoder in the bit stream, the video decoder performs a motion compensation process utilizing the locally generated motion vectors, along with an entropy decoding process of the residual data in the bit stream, to construct the bi-directionally predicted B picture.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
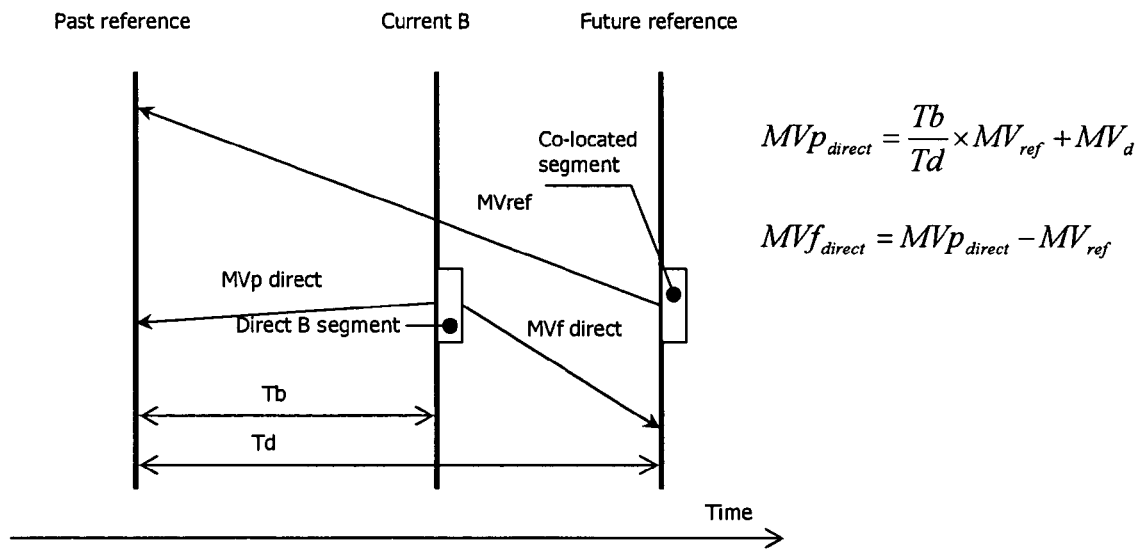
FIG. 1 is a simplified schematic diagram illustrating a direct mode of the MPEG4 standard.
Figure 2:
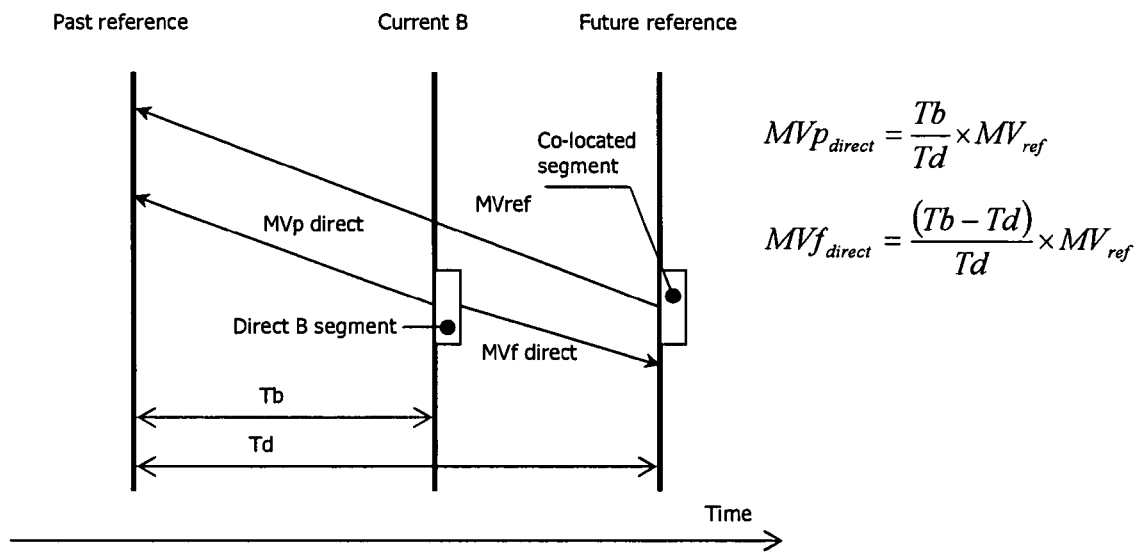
FIG. 2 is a simplified schematic diagram illustrating a direct mode of the H.264 standard.
Figure 3:
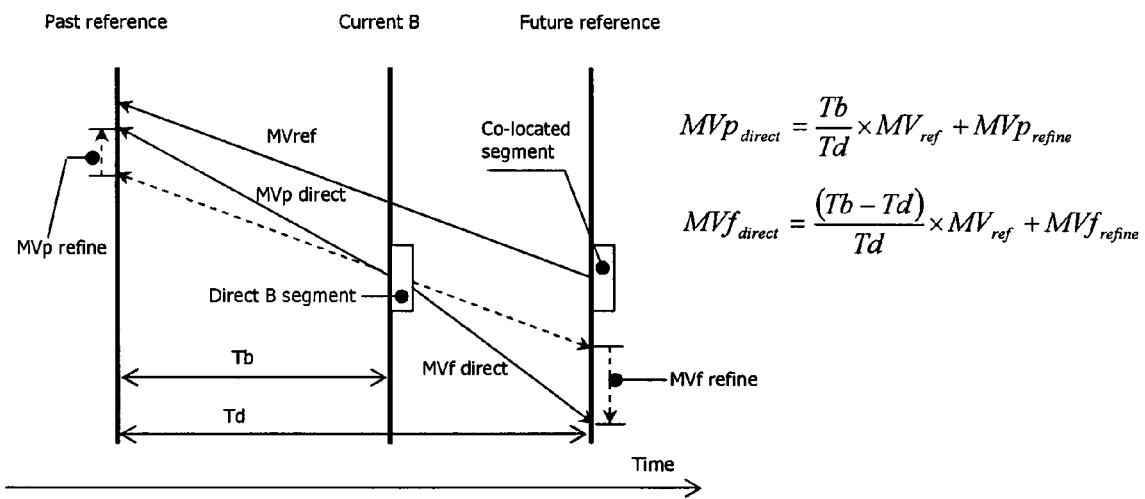
FIG. 3 is a simplified schematic diagram illustrating a direct mode according to one embodiment of the present invention.

One or more embodiments of the present invention will now be described. The present invention enhances the scope of direct modes for bi-directional prediction in B pictures and provides a new mode for bi-directional prediction with improved coding efficiency. FIG. 3 illustrates the direct mode according to one embodiment of the present invention.

The current ISO/ITU H.264 video standard supports multiple block sizes for motion compensated prediction. The block sizes vary from 16×16 pixels to 4×4 pixels and blocks can be of square and rectangular shapes. Multiple block sizes allow for accurate computations of temporal predictions that are used for predictive coding. Smaller block sizes facilitate better matches that reduce the residual data to be encoded. However, smaller block sizes also increase the amount of motion vector data to be encoded. Such increase is particularly significant in the case of B pictures.

The conventional direct modes for B pictures avoid sending the motion vector information. Instead, crude predictions are formed using estimated motion vectors. The motion vectors used in such conventional direct modes are estimated by scaling the forward motion vectors between the already encoded reference pictures. The motion vectors used in the scaling process are generated at the time the forward reference picture of the current B picture is encoded. At the time of generation of these motion vectors, the forward reference picture is generally in raw form. On the other hand, at the time of encoding of the current B picture, all the reference pictures have already been processed and reconstructed. Hence, the reference pictures are now considerably modified through the quantization process and in-loop filtering (if used). The estimated forward motion vectors are thus no longer accurate and are valid only for linear motion of low intensity.

In addition, in the conventional direct modes for B pictures, the negative values of the above-mentioned inaccurate forward motion vectors are used to predict the B picture from the backward direction. This is again a crude approximation. As a result, as the motion intensity and scene complexity increase, the use of estimated motion vectors produces suboptimal results with low coding efficiency.

To cope with the foregoing problem, certain standards like MPEG4 allow coding a small delta motion vector per segment in order to correct the errors introduced by scaling of the motion vectors of reference pictures. However, this approach is undesirable for small block sizes when motion content to be coded is large. Furthermore, this approach also utilizes the negative values of the forward motion vectors between reference pictures to predict the B picture from the backward direction.

Figure 4:
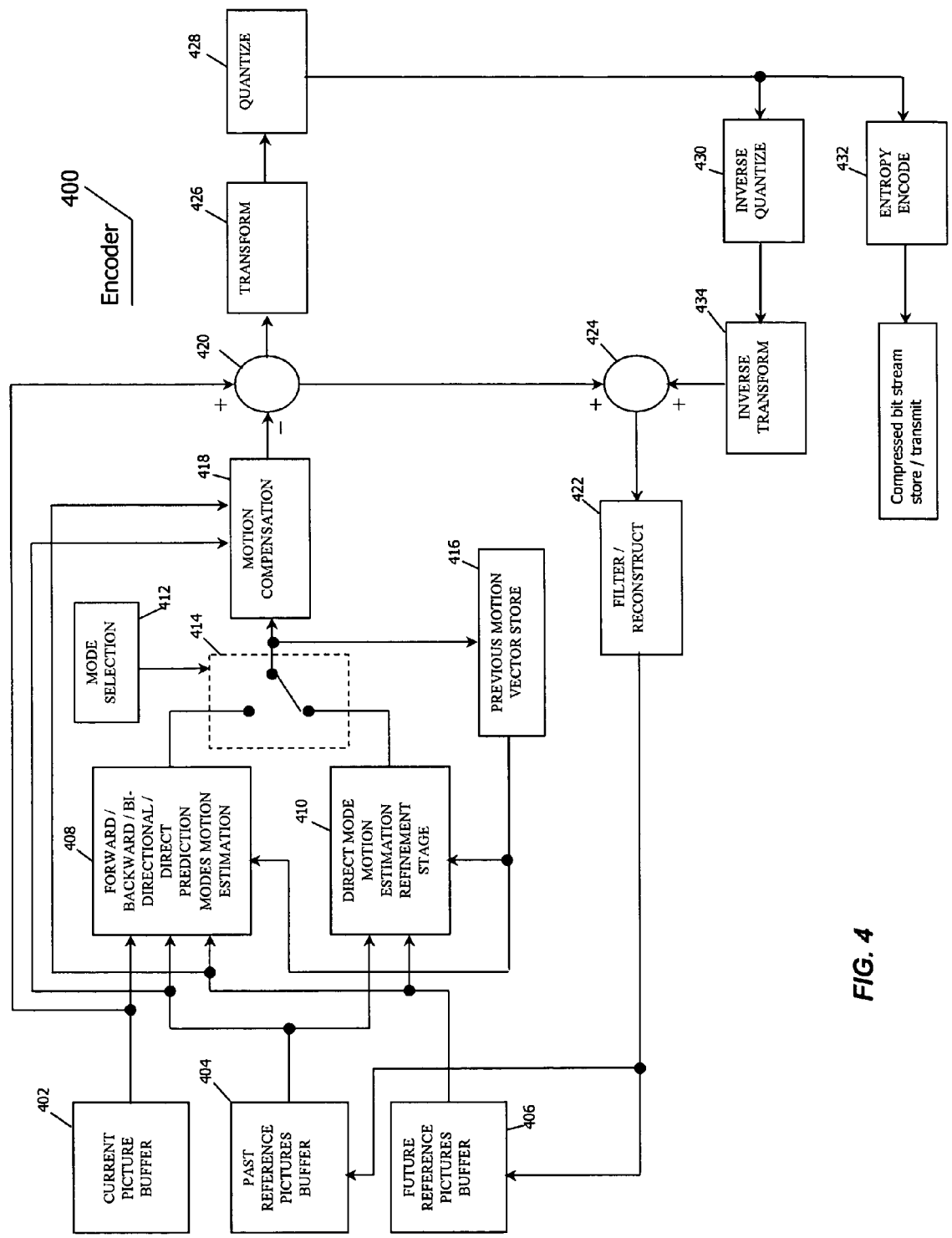
FIG. 4 is a simplified schematic diagram illustrating an encoder functionality according to one embodiment of the present invention.
Figure 5:
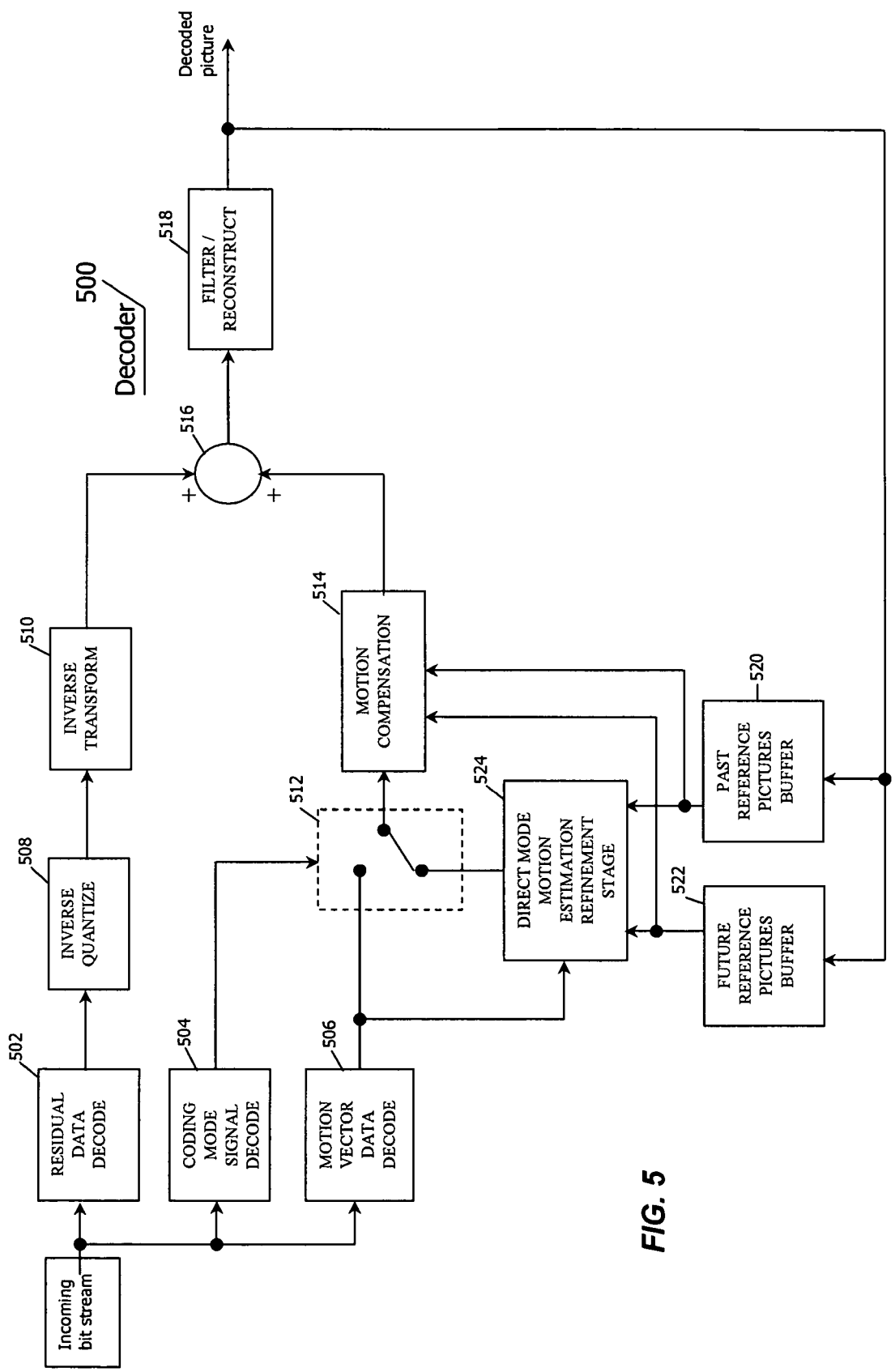
FIG. 5 is a simplified schematic diagram illustrating a decoder functionality according to one embodiment of the present invention.

According to one embodiment of the present invention, a complementary pair of video encoder and decoder is provided. FIGS. 4 and 5 illustrate the video encoder 400 and decoder 500 respectively. As shown in FIG. 4, in one embodiment, the video encoder 400 may include (1) a number of buffers 402, 404 and 406 for storing and providing respective information relating to the current B picture, past reference pictures and future reference pictures, (2) a module 408 configured to perform motion estimation for various modes including the forward, backward and direct bi-directional predictive modes, (3) a module 410 configured to perform motion vector refinement for a temporal direct mode, (4) a multiplexer 414, (5) a mode selection module 412 configured to control the multiplexer 414 so as to select output from either the module 408 and the module 410, (6) a motion compensation module 418 configured to provide motion compensation for a segment of the current B picture using one or more reference pictures in the forward, backward or bi-directional directions, (7) a buffer 416 for storing previous motion vectors, and (8) a number of other modules collectively configured to generate an encoded bit stream. The other modules include a transform module 426, a quantize module 428, an inverse quantize module 430, an inverse transform module 434, an entropy encode module 432, a filter/reconstruct module 422 and a number of adders 420 and 424.

Figure 6:
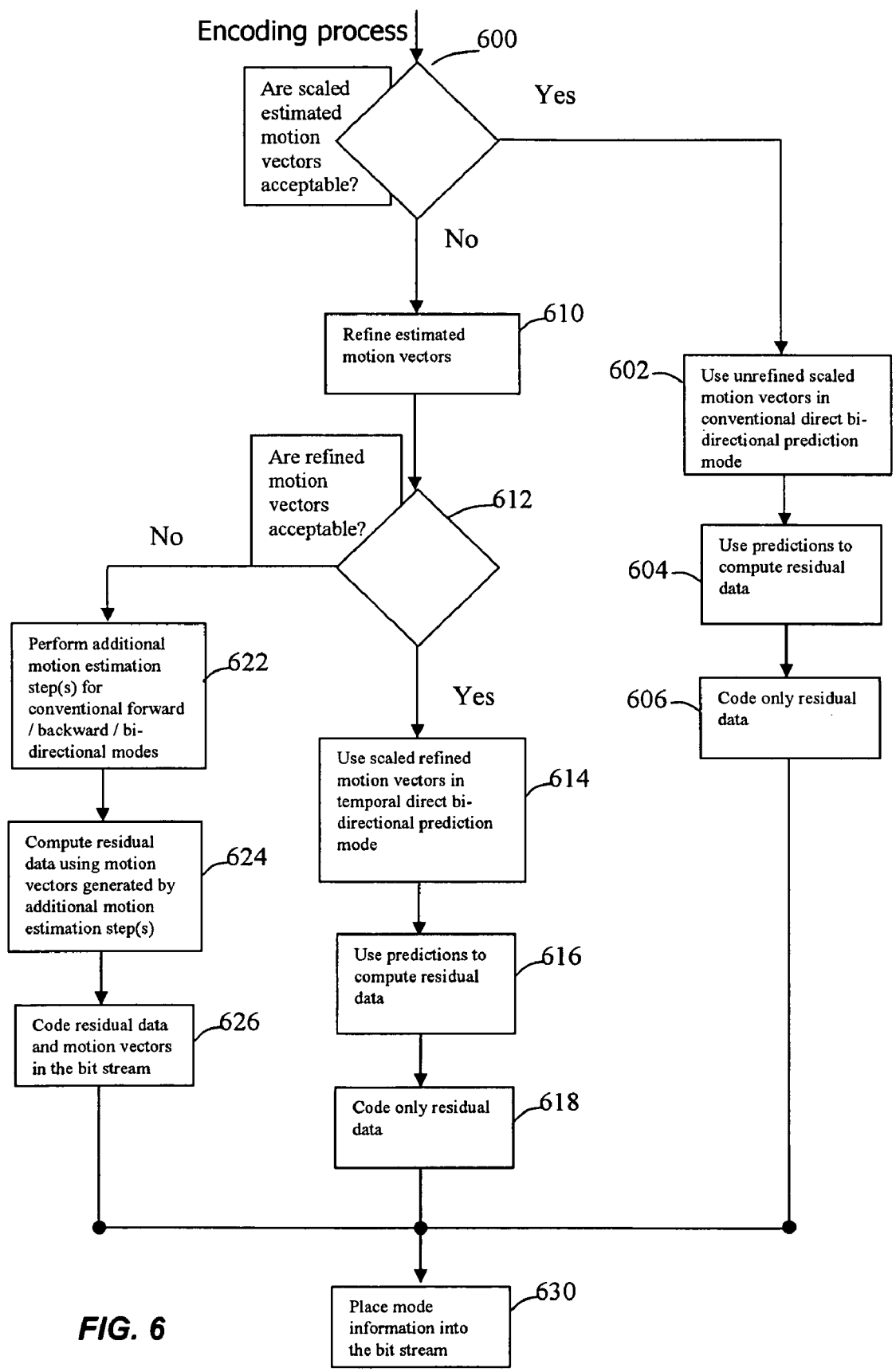
FIG. 6 is a flow diagram illustrating the operational flow of an encoder according to one embodiment of the present invention.

The video encoder 400 operates in the following manner as illustrated in FIG. 6. At block 600, the video encoder 400 determines whether the above-mentioned scaled-estimated motion vectors are acceptable for conventional direct bi-directional predictive coding. The suitable criterion of acceptable level may vary depending on the scene content and the application. In one embodiment, the encoder 400 makes this decision on the basis of a measure of difference between a segment in the input image and the corresponding motion compensated segment in the reference image. A simple way to compute the difference measure is to calculate the sum of absolute differences (SAD) between the above-mentioned segments. It may be noted here that any other difference measure may also be used. If it is determined that the estimates are acceptable, at block 602, the video encoder 400 then uses the scaled estimates of motion vectors directly for direct bi-directional prediction. In other words, in the situation where the conventional direct bi-directional prediction mode is selected, the video encoder 400 uses the unrefined scaled previously decoded motion vectors between reference pictures for the above-mentioned segment to form predictions. At block 604, the video encoder 400 may then use these predictions to compute residual data. Moreover, at block 606, the video encoder 400 codes the residual data of the bi-directionally predicted segment of the B picture into the bit stream. Furthermore, at block 630, the video encoder 400 may include control logic configured to place bit markers (signals) in the encoded bit stream to help a compliant decoder identify from such bit stream the mode used for encoding the picture segments.

On the other hand, if it is determined that the estimates are not acceptable, at block 610, the estimates are improved or refined further before they are used by the video encoder 400 for direct bi-directional prediction. In the situation where the video encoder 400 determines that the estimated motion vectors need to be improved, the module 410 in the video encoder 400 performs motion estimation refinement step(s) at block 610, between the already constructed reference pictures of the B picture in the forward and/or backward directions.

It should be noted that the scope of the present invention is not limited by the motion estimator type or the search window size used during the motion estimation step(s). For example, if multiple block sizes (16×16 pixels to 4×4 pixels) are available, a small search window of the order of 4×4 pixels is usually enough to significantly improve the motion estimated predictions that are to be used in the direct bi-directional coding.

At block 612, the video encoder 400 determines whether the refined motion vectors are acceptable for direct bi-directional predictive coding. The suitable criterion of acceptable level may vary depending on the scene content and the application. In one embodiment, the encoder 400 makes this decision on the basis of a measure of difference between the segment in the input image and the corresponding motion compensated segment in the reference image. A simple way to compute the difference measure is to calculate the sum of absolute differences (SAD) between the above-mentioned segments. It may be noted here that any other difference measure may also be used.

The results of blocks 600 and 612 represent the mode selection procedures used by the module 412 in the video encoder 400 to select the most appropriate mode for coding a segment of the current B picture from amongst the conventional modes of encoding B pictures (including the direct, forward, backward and bi-directional predictive modes) and the new temporal direct mode as described herein.

If the refined motion vectors are acceptable, then the new temporal direct mode is selected and, at block 614, the video encoder 400 uses the improved motion vectors for the above-mentioned segment to form forward, backward, or bi-directional predictions. At block 616, the video encoder 400 may then use these predictions to compute residual data. Moreover, at block 618, the video encoder 400 only codes the residual data of the bi-directionally predicted segment of the B picture into the bit stream, while the improved motion vectors are not coded. Furthermore, at block 630, the video encoder 400 may place bit markers (signals) in the encoded bit stream to help a compliant decoder identify from such bit stream the mode used for encoding the picture segments.

It should be noted that although the new temporal direct mode as described herein does not require coding of the improved motion vectors used for motion estimation based prediction, the scope of the present invention is not so limited. If appropriate, in some embodiments of the present invention, corrective delta motion vectors may be coded in the bit stream at a coarse or fine block level. If corrective delta motion vectors are to be coded, separate motion estimation stage(s) between the current B picture and reference picture(s) are used.

Alternatively, where the refined motion vectors are not acceptable, a conventional mode, other than a direct mode, is then selected for coding a segment of the B picture, and at block 622, additional motion estimation step(s) are performed where appropriate to generate new motion vectors. It may be noted here that the motion estimation step(s) at block 622 differ from the step(s) in the refinement stage at block 610. The major difference lies in the fact that, at block 610, a motion vector is estimated and refined between already constructed reference pictures, while at block 622, a motion vector is estimated between an input image and a single or multiple reference images. At block 624, motion vectors generated by the additional motion estimation step(s) are used to compute residual data. At block 626, these motion vectors and the residual data are both coded into the bit stream. Furthermore, at block 630, the video encoder 400 may place bit markers (signals) in the encoded bit stream to help a compliant decoder identify from such bit stream the mode used for encoding the picture segments.

As mentioned above, a video decoder 500 that is complementary to the video encoder 400 is also disclosed. FIG. 5 illustrates an embodiment of the video decoder 500. The video decoder 500 may include (1) modules 502, 504 and 506 that are respectively configured to decode the residual data, the mode information and the motion vectors encoded in a bit stream received from the video encoder 400, (2) buffers 520 and 522 for storing and providing information relating to past and future reference pictures, (3) modules 508 and 510 that are respectively configured to provide inverse quantization and inverse transformation with respect to the decoded residual data, (4) a module 524 configured to provide motion vector refinement, (5) a multiplexer 512 configured to select output from either the module 506 or the module 516 depending on which mode is selected for coding the segment of the B picture, (6) a motion compensation module 514 configured to perform motion estimation based compensation with respect to the decoded residual data, and (7) a number of ancillary elements including the adder 516 and the filter/reconstruct module 518.

Figure 7:
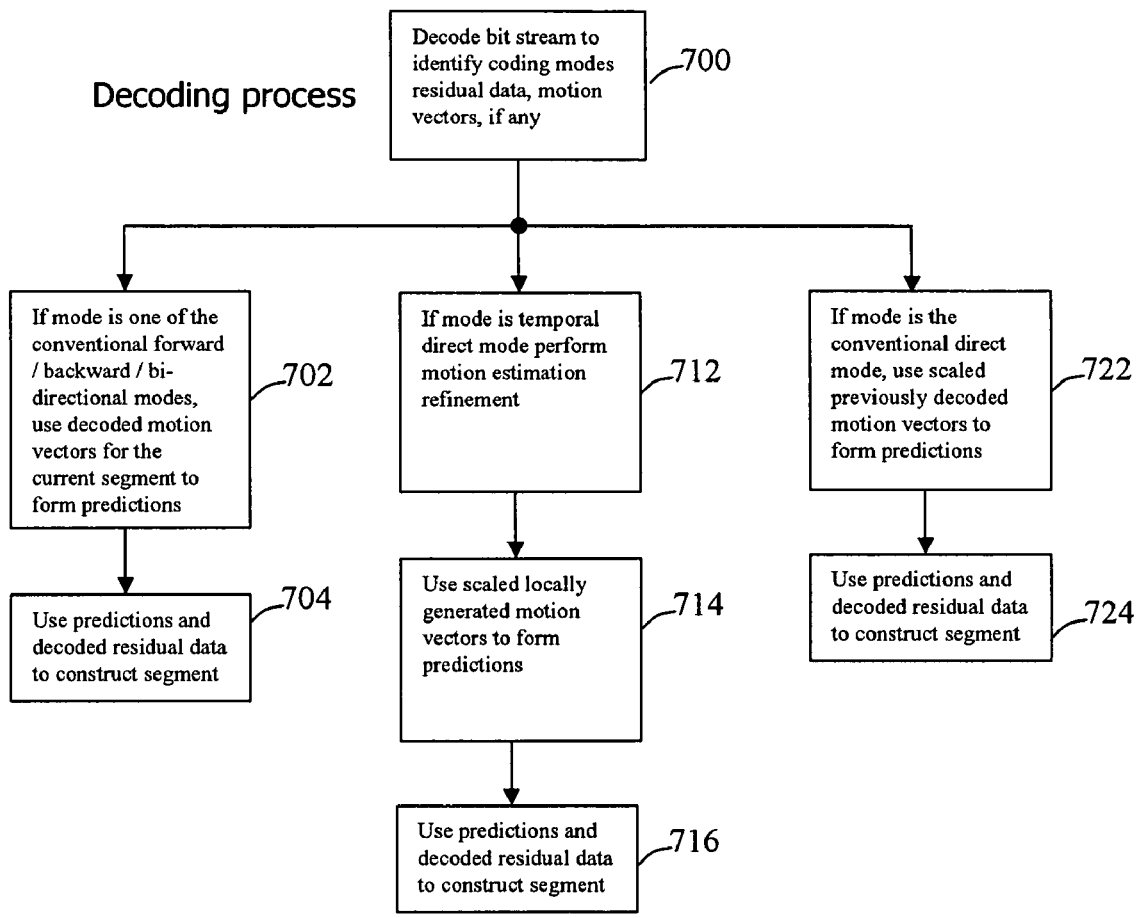
FIG. 7 is a flow diagram illustrating the operational flow of a decoder according to one embodiment of the present invention.

The video decoder 500 operates in the following manner as illustrated in FIG. 7. At block 700, the various modules 502, 504 and 506 of the video decoder 500 decode the segments of a bi-directionally predicted B picture as encoded by the above-mentioned video encoder 400. The residual data, the modes, including the new temporal direct mode as described herein, that were used to encode the picture segments, and the motion vectors, if any, are identified.

At block 712, upon identifying a picture segment that was encoded by the new temporal direct mode as described herein, the video decoder 500 performs motion estimation refinement between the reference pictures of the B picture. Information relating to the reference pictures is provided by the buffers 520 and 522. The motion estimation refinement process used by the video decoder 500 should match the motion estimation refinement process that was used by the above-mentioned video encoder 400. Furthermore, the video decoder 500 performs the motion estimation refinement between the same reference pictures of the bi-directionally predicted B picture that were used by the above-mentioned video encoder 400 while encoding the same segment of the B picture. The video decoder 500, therefore, locally generates the same motion vectors in the forward and/or backward directions, as were generated and used by the video encoder 400 to code the bi-directionally predicted segment.

At block 714, the video decoder 500 uses its locally generated motion vectors to form predictions for the picture segment to be decoded. At block 716, the video decoder 500 further uses such predictions and the decoded residual data from the bit stream to construct the picture segment. It should be noted that the scope of the present invention is not limited by the type of motion estimator used or by the size of search window used during the motion estimation step(s).

Alternatively, at block 702, if it is determined that the mode used to code the segment is one of the conventional modes (other than the conventional direct mode), the motion vectors decoded from the bit stream for the picture segment to be decoded are used to form the predictions for the picture segment. At block 704, the video decoder 500 further uses such predictions and the decoded residual data from the bit stream to construct the picture segment.

Alternatively, at block 722, if it is determined that the mode used to code the segment is the conventional direct mode, the motion vectors of the previously decoded reference pictures are scaled and used to form the predictions for the picture segment. At block 724, the video decoder 500 uses such predictions and the decoded residual data from the bit stream to construct the picture segment.

Thus, the present invention avoids coding of motion vectors for the direct bi-directional prediction mode and is still able to use improved motion vectors for predictive coding. The efficiency of the present invention is high even when motion vectors are not available in the reference picture(s), as in the case of Intra segments in the reference pictures. The coding efficiency of the direct bi-directional mode is therefore increased.

It should be noted here that although the direct mode as described herein does not require decoding of the motion vectors used for motion estimation based prediction, the scope of the present invention is not limited by the foregoing feature. In some embodiments, corrective delta motion vectors may be coded in the bit stream. These corrective delta motion vectors may be coded at a coarse or fine block level. In such cases, the video decoder 500 will perform all the steps that are needed to decode the corrective delta motion vectors, and use these decoded motion vectors in motion estimation based prediction as well.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A method comprising:
encoding, by a video encoder, at least one segment of a B picture using motion estimation based prediction, said encoding including the steps of:
determining whether a first plurality of motion vectors computed through a motion estimation process between a current picture and one or more constructed reference pictures of the B picture are acceptable for encoding the at least one segment of the B picture in accordance with a first bi-directional temporal direct prediction mode;
in response to a determination that the first plurality of motion vectors are acceptable for encoding the at least one segment in accordance with the first bi-directional temporal direct prediction mode, encoding the at least one segment using the first plurality of motion vectors in accordance with the first bi-directional temporal direct prediction mode, otherwise refining the first plurality of motion vectors through a motion estimation refinement process between the one or more constructed reference pictures of the B picture to produce a second plurality of motion vectors;
determining whether the second plurality of motion vectors are acceptable for encoding the at least one segment in accordance with a second bi-directional temporal direct prediction mode, the second bi-directional temporal direct prediction mode different from the first bi-directional temporal direct prediction mode; and
in response to a determination that the plurality of second motion vectors are acceptable for encoding the at least one segment in accordance with the second bi-directional temporal direct prediction mode, encoding the at least one segment using the second plurality of motion vectors in accordance with the second bi-directional temporal direct prediction mode by computing residual data for the at least one segment using the second plurality of motion vectors and performing transformation, quantization and entropy encoding of the residual data to generate an encoded bit stream, otherwise encoding the at least one segment in accordance with a mode other than the first and second bi-directional temporal direct prediction modes; and decoding, by a video decoder configured to receive the encoded bit stream from the video encoder, the at least one segment of the B picture from the encoded bit stream, said decoding including the steps of:

performing entropy decoding of the encoded bit stream to recreate the residual data;

determining which mode was used for encoding the at least one segment;

in response to determining that the second bi-directional temporal direct prediction mode was used to encode the encoded bit stream:

performing local motion estimation refinement between the one or more constructed reference pictures of the B picture, wherein (i) the local motion estimation refinement is identical to the motion estimation refinement process performed to refine the first plurality of motion vectors and (ii) the local motion estimation refinement generates a plurality of local motion vectors;

performing inverse quantization and inverse transformation with respect to the residual data;

performing motion estimation based compensation with respect to the residual data using the plurality of local motion vectors; and constructing the B picture using a plurality of decoded segments related to the B picture.

2. The method of claim 1, wherein refining the first plurality of motion vectors comprises refining the first plurality of motion vectors in at least one of the forward and backward directions.

3. The method of claim 1, wherein the second plurality of motion vectors are not included in the encoded bit stream.

4. The method of claim 1 further comprising placing in the encoded bit stream information identifying a mode selected for encoding the at least one segment.

5. The method of claim 1, wherein encoding the at least one segment in accordance with the mode other than the first and second bi-directional temporal direct prediction modes includes performing one or more additional motion estimation steps to generate a third plurality of motion vectors.

6. The method of claim 5, wherein encoding the at least one segment in accordance with the mode other than the first and second bi-directional temporal direct prediction modes further includes computing residual data for the at least one segment using the third plurality of motion vectors.

7. The method of claim 6, wherein encoding the at least one segment in accordance with the mode other than the first and second bi-directional temporal direct prediction modes further includes (i) performing transformation, quantization and entropy encoding of the residual data to generate an encoded bit stream; and (ii) transmitting the third plurality of motion vectors in the encoded bit stream.

8. The method of claim 1, wherein encoding the at least one segment in accordance with the first bi-directional temporal direct prediction mode includes computing residual data for the at least one segment using the first plurality of motion vectors.

9. The method of claim 1, wherein encoding the at least one segment in accordance with the mode other than the first and second bi-directional temporal direct prediction modes includes predicting the at least one segment based on one or more reference pictures in the backward direction.

10. The method of claim 1, wherein encoding the at least one segment in accordance with the mode other than the first and second bi-directional temporal direct prediction modes includes predicting the at least one segment based on one or more reference pictures in the forward direction.

11. The method of claim 1, wherein encoding the at least one segment in accordance with the mode other than the first and second bi-directional temporal direct prediction modes includes predicting the at least one segment based on one or more reference pictures in the forward and backward directions.

12. The method of claim 1, wherein the at least one segment of the B picture is not used for predicting a segment of another picture.

13. The method of claim 1, wherein the at least one segment of the B picture is used for predicting a segment of another picture.

14. The method of claim 1 wherein the decoding further comprises:

in response to determining that the mode other than the first and second bi-directional temporal direct prediction modes was used to encode the at least one segment, (i) decoding a plurality of motion vectors from the encoded bit stream, and (ii) performing motion estimation based compensation with respect to the residual data using the plurality of decoded motion vectors.

15. The method of claim 1 wherein performing motion estimation based compensation further uses corrective delta motion vectors decoded from the encoded bit stream.

\* \* \* \* \*